(12) United States Patent
Jacobson et al.

(10) Patent No.: US 7,149,187 B1
(45) Date of Patent: Dec. 12, 2006

(54) RANDOM EARLY DETECTION POLICER USING RANDOMIZATION OF PACKET DROPS

(75) Inventors: Van Jacobson, Woodside, CA (US); Kathleen Nichols, Woodside, CA (US); Chandrashekhar Appanna, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 890 days.

(21) Appl. No.: 09/750,403

(22) Filed: Dec. 28, 2000

(51) Int. Cl.
*H04L 1/16* (2006.01)
*H04L 12/56* (2006.01)

(52) U.S. Cl. ...................... 370/235; 370/234
(58) Field of Classification Search ............... 370/229, 370/230, 230.1, 231–232, 234, 235, 235.1, 370/236, 237, 252, 262
See application file for complete search history.

(56) References Cited

U.S. PATENT DOCUMENTS

| | | | | |
|---|---|---|---|---|
| 4,569,042 A * | 2/1986 | Larson | ........................ | 370/250 |
| 5,617,409 A * | 4/1997 | Ozveren et al. | ............ | 370/235 |
| 5,805,602 A * | 9/1998 | Cloutier et al. | ............ | 370/516 |
| 5,864,540 A * | 1/1999 | Bonomi et al. | ............ | 370/235 |
| 6,072,776 A * | 6/2000 | Takamichi | ............... | 370/241.1 |
| 6,092,115 A * | 7/2000 | Choudhury et al. | ........ | 709/235 |
| 6,108,303 A * | 8/2000 | Fahmi et al. | ................ | 370/230 |
| 6,118,764 A * | 9/2000 | Depelteau et al. | .......... | 370/235 |
| 6,144,639 A * | 11/2000 | Zhao et al. | .................. | 370/235 |
| 6,198,743 B1 * | 3/2001 | Giroux et al. | ............ | 370/235.1 |
| 6,240,463 B1 * | 5/2001 | Benmohamed et al. | ..... | 709/238 |
| 6,331,970 B1 * | 12/2001 | Nieh et al. | ................... | 370/230 |
| 6,333,917 B1 * | 12/2001 | Lyon et al. | ................. | 370/236 |
| 6,381,214 B1 * | 4/2002 | Prasad | ..................... | 370/230.1 |
| 6,469,991 B1 * | 10/2002 | Chuah | ........................ | 370/329 |
| 6,515,963 B1 * | 2/2003 | Bechtolsheim et al. | ..... | 370/229 |
| 6,556,578 B1 * | 4/2003 | Silberschatz et al. | ....... | 370/412 |
| 6,560,198 B1 * | 5/2003 | Ott et al. | ..................... | 370/235 |
| 6,600,720 B1 * | 7/2003 | Gvozdanovic | .............. | 370/230 |
| 6,633,575 B1 * | 10/2003 | Koodli | ........................ | 370/412 |
| 6,640,302 B1 * | 10/2003 | Subramaniam et al. | ..... | 713/169 |
| 6,671,258 B1 * | 12/2003 | Bonneau | ..................... | 370/235 |
| 6,674,718 B1 * | 1/2004 | Heddes et al. | .............. | 370/230 |
| 6,675,220 B1 * | 1/2004 | Bergamasco et al. | ....... | 709/232 |
| 6,687,247 B1 * | 2/2004 | Wilford et al. | ............. | 370/392 |
| 6,690,645 B1 * | 2/2004 | Aweya et al. | ............... | 370/230 |
| 6,724,726 B1 * | 4/2004 | Coudreuse | .................. | 370/235 |
| 6,748,435 B1 * | 6/2004 | Wang et al. | ................ | 709/225 |
| 6,754,182 B1 * | 6/2004 | Aznar et al. | ................ | 370/252 |
| 6,757,248 B1 * | 6/2004 | Li et al. | ..................... | 370/235 |
| 6,788,697 B1 * | 9/2004 | Aweya et al. | ............... | 370/412 |

(Continued)

OTHER PUBLICATIONS

Lin et al, "Dynamics of Random Early Detection", Sep. 1997, pp. 1-11.*

(Continued)

*Primary Examiner*—Doris H. To
*Assistant Examiner*—Ahmed Elallam
(74) *Attorney, Agent, or Firm*—Cesari and McKenna LLP (57) ABSTRACT

A Random Early Detection (RED) policer in accordance with the invention does not tail-drop arriving packets as being non-conforming. For instance, because the RED policer uses a running estimate such as an exponential weighted moving average (EWMA), for example, it allows the policer to absorb traffic bursts. The policer uses randomization in choosing which packets to drop; with this method, the probability of dropping a packet from a particular sending node is roughly proportional to the node's bandwidth share, hence the packets of different flows are fairly dropped.

60 Claims, 7 Drawing Sheets

U.S. PATENT DOCUMENTS

| | | | |
|---|---|---|---|
| 6,795,399 B1 * | 9/2004 | Benmohamed et al. | 370/235 |
| 6,795,865 B1 * | 9/2004 | Bahl et al. | 709/235 |
| 6,820,128 B1 * | 11/2004 | Firoiu et al. | 709/233 |
| 6,826,151 B1 * | 11/2004 | Li et al. | 370/230.1 |
| 6,829,649 B1 * | 12/2004 | Shorey et al. | 709/235 |
| 6,839,321 B1 * | 1/2005 | Chiruvolu | 370/230.1 |
| 6,842,424 B1 * | 1/2005 | Key et al. | 370/236 |
| 6,862,298 B1 * | 3/2005 | Smith et al. | 370/516 |
| 6,888,824 B1 * | 5/2005 | Fang et al. | 370/359 |
| 6,894,974 B1 * | 5/2005 | Aweva et al. | 370/230.1 |
| 6,904,015 B1 * | 6/2005 | Chen et al. | 370/235 |
| 6,907,003 B1 * | 6/2005 | Gvozdanovic | 370/232 |
| 6,917,585 B1 * | 7/2005 | Firoiu et al. | 370/229 |
| 6,977,942 B1 * | 12/2005 | Raisanen | 370/429 |
| 6,987,732 B1 * | 1/2006 | Gracon et al. | 370/235.1 |
| 2002/0105908 A1 * | 8/2002 | Blumer et al. | 370/230 |
| 2002/0110134 A1 * | 8/2002 | Gracon et al. | 370/412 |

OTHER PUBLICATIONS

Sally Floyd, Van Jacobson Random Early Detection Gateways for Congestion Avoidance Aug. 1993 pp. 1-32.

V. Jacobson, K. Nichols, K. Poduri Cisco Systems RED in a Different Light pp. 1-38.

Van Jacobson Notes on using RED for Queue Management and Congestion Avoidance Jun. 8, 1998.

* cited by examiner

RANDOM EARLY DETECTION POLICER USING RANDOMIZATION OF PACKET DROPS

BACKGROUND OF THE INVENTION

1. Field of the Invention

The present invention pertains to data traffic management and in particular to data traffic policers.

2. Background Information

Packet-based data communication is a technique in which information at the source is formed into packets and transmitted through a medium, and at the destination, the packets are reassembled back to their original form. Each packet usually has a pay-load such as data, voice, image or any other type of information. Packet-based trafficking is very suitable for use in a network in that other than the particular time interval in which the network resources are dedicated to the transmission of the packet, the remaining time period is available for other packets to be transmitted. This time sharing arrangement along with the flexibility and speed of transmitting integrated information makes packet-based communication the standard method of communication used in the Internet.

Resources generally available to an Internet Service Provider (ISP) are limited. There is only a limited amount of bandwidth in which the ISP can channel packets through a network. Typically, an ISP used by a source station sends packets through the network to an ISP used by a destination station. A path through the worldwide Internet is typically supplied by a backbone provider. Within the network, a plurality of network devices (nodes) are connected together to forward the packets until eventually they arrive at their destination at an end station such as a client computer or a server. A node may be a router that processes and routes received packets to their appropriate destination. A router usually has multiple ingress/egress ports through which packets are channeled in and out of the router. Because a router is only able to process a finite number of packets at a given time, when the traffic exceeds this bandwidth, congestion usually occurs. Often this congestion occurs at a border to an ISP, although congestion may also occur internal to the network. Congestion is usually alleviated by "dropping" packets. For instance, if a router receives more packets than it can handle, it simply "drops" the incoming packets until it regains the capacity to handle the packets. If the communication protocol used is the Transmission Control Protocol (TCP), the sending node is usually notified when a packet is received (ACK message) and times out when it does not receive an ACK because a packet was dropped. Timing out usually causes the sending node to transmit the packets at a lower transmission rate. Because the transmission is duplicated for the lost packets, there occurs a higher consumption of the already limited bandwidth and a further deterioration in the efficacy of the network. Furthermore, the retransmitted packets are delivered late, if at all, slowing down the interchange of information.

From the ISP's point of view, it is desirable to manage the network so as to provide a better and a more predictable service in terms of bandwidth, latency and loss characteristics. In many instances and for various reasons, a user and the ISP will enter into a "traffic contract" that sets forth a rate in which the user may transmit data to the ISP's network. The term "traffic contract" is used to mean any agreement or decision that traffic through a particular network device is to be limited to a rate less than the wire rate, where the wire rate is the maximum rate which the physical interconnection can deliver. For example, the traffic contract may be between a customer and an ISP to limit the rate which the customer delivers packets (or bytes) to the ISP, or the rate at which the ISP delivers packets to the customer. Further, the traffic contract may be used in an enterprise network in order to limit certain types of traffic into or out of the network, for example between hosts and "the network" in order to meet traffic engineering goals. In the enterprise network example, there is no "contract" between an end user and someone else, the contract is simply how the network is set up. As a further example, a traffic contract may be involved in setting up a quality of service (QoS) arrangement with an end user. As a further example, the traffic contract rate may be to set a limit on the amount of traffic which gets special treatment in the network, or just to limit the amount of traffic in general. Also, the ISP may have a traffic contract with the provider of the network back-bone. It is usually the burden of the user to shape the traffic to meet the contracted rate. However, the ISP, the backbone (or forwarder) provider, the customer, the parts of an enterprise network, etc. may place a "policer" at ports of his exit nodes to enforce the contract.

The policer monitors its incoming packets to determine if they conform to the contract. If a packet is non-conforming (i.e., exceeds the contract rate), the policer may simply "drop" the packet. In many non-ideal implementations, a policer may be implemented to drop packets in a manner that is similar to that of a "tail-drop" in a traffic congestion situations. Tail-dropping occurs when a node is not able to handle any more incoming packets. For example, a queue simply fills up from a burst and drops all later arriving packets. A disadvantage pertaining to tail dropping is that it is very unfair. Stated differently, different connections may not have their packets dropped proportionally according to their usage. It is desirable to have a traffic policing method which does not do "tail dropping".

Figure 1:
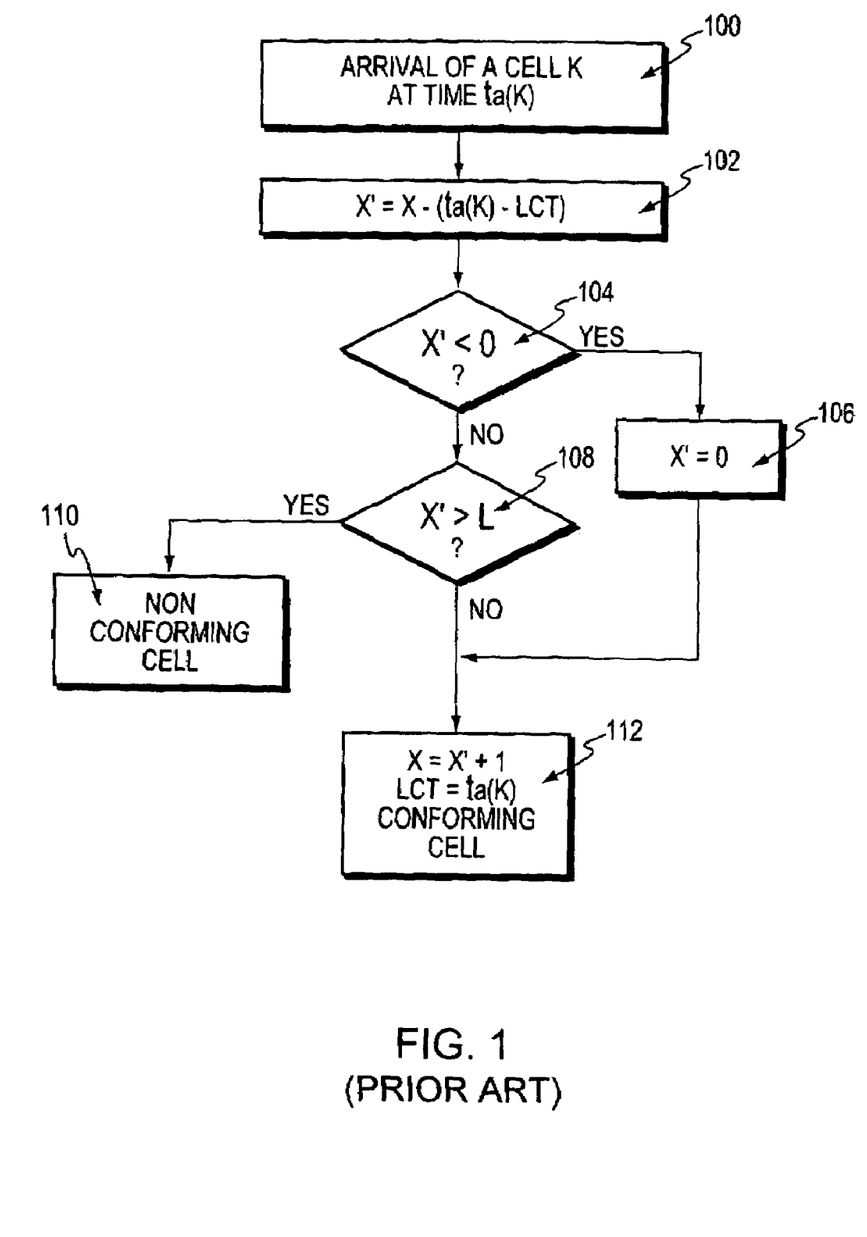
FIG. 1 is a flowchart of a conventional continuous-state leaky bucket algorithm.

On a different note, one known traffic-policing algorithm is the "leaky bucket" algorithm (for example as used in the Asynchronous Transfer Mode (ATM) Protocol, and as described in the ATM Forum's Traffic Management Specification Version 4.1). ATMs forward fixed size packets known as "cells." A continuous-state leaky bucket algorithm, as its name implies, can be imagined as a finite-capacity bucket (actually a queue or a counter) in which a real-valued content drains out at a continuous rate of 1 unit of content per time-unit and whose content is increased by the increment 1 for each conforming cell. The leaky bucket algorithm is fully described by Andrew S. Tanenbaum in his book *Computer Networks*, Third Edition, published by Prentice Hall, Copy-right date 1996, all disclosures of which are incorporated herein by referenced, particularly at pages 380–381. As shown in FIG. 1, at block 100, the algorithm is activated when a cell is received. At its initiating state, the content of the bucket is zero. With the arrival of the first cell ta(1), the Last Conformance Time (LCT) is set to ta(1). With the successive arrival of the cells such as the kth cell at time ta(k), at block 102, the content of the bucket x' is updated to equal to the value of the leaky bucket at the arrival of the last conforming cell minus the amount the bucket has drained since that arrival. Note that the content of the bucket can-not be less than zero and at blocks 104–106, if the content of the bucket x' is less than zero, the value x' is adjusted to zero. At block 108, if the value x' is greater than a limit value L, the cell is non-conforming and at block 110, the values of x' and LCT remain unchanged. Otherwise if the value x' is less than or equal to the limit value L, the cell is conforming and at block 112, the bucket content x is set to x' plus the increment 1 for that current cell and the LCT is set to ta(k). Further details may be found in the forum paper specified above.

The leaky bucket algorithm described above, however, tail drops "bursts" that may occur in traffic. The bucket fills, and before it empties more packets arrive because of the burst. After the bucket fills, all subsequent packets are simply discarded since they arrive faster than the bucket empties.

In another known example, a dual-leaky bucket is used to accommodate for the data bursts. The first leaky bucket polices the cells for conformance to the sustained cell rate as agreed in the contract. The second leaky bucket polices the cells for compliance with the maximum burst size allowable by the contract. Besides the leaky bucket approach, other approaches may be used such as the virtual scheduling algorithm using theoretical arrival time (TAT) also described in the forum paper. However, the virtual scheduling algorithm, too, suffers the drawbacks of tail dropping in bursty traffic.

There is needed a traffic policer which drops packets from flows in proportion to the amount of bandwidth used by the flows so that the dropping is fair, and also which does not tail drop when receiving bursty flows.

SUMMARY OF THE INVENTION

A Random Early Detection (RED) policer in accordance with the invention permits bursty traffic and does not tail-drop arriving packets. The policer uses randomization in choosing which packets to drop. With randomization the probability of dropping a packet from a particular sending node is roughly proportional to the node's bandwidth share, hence the invention is fair to nodes using different amounts of bandwidth.

According to one embodiment, the RED policer can be viewed as controlling a virtual queue in which its capacity limit is determined by a virtual time debt. A virtual time debt for each packet is a difference between the real time of a packet arrival and the theoretical (virtual) time the packet should have arrived. The time that the packet should have arrived is given by the traffic contract. The RED policer calculates a filtered virtual time debt, for example by using an Exponential Weighted Moving Average (EWMA) filter. When the filtered virtual time debt exceeds some predetermined minimum threshold, the RED policer drops the next packet and then starts to randomly drop packets based on a probability determination. That is, the drop probability increases with increasing filtered virtual time debt, and all packets are dropped once the filtered virtual time debt reaches an upper threshold.

BRIEF DESCRIPTION OF THE DRAWINGS

The invention description below refers to the accompanying drawings, of which.

DETAILED DESCRIPTION OF AN ILLUSTRATIVE EMBODIMENT

Figure 2:
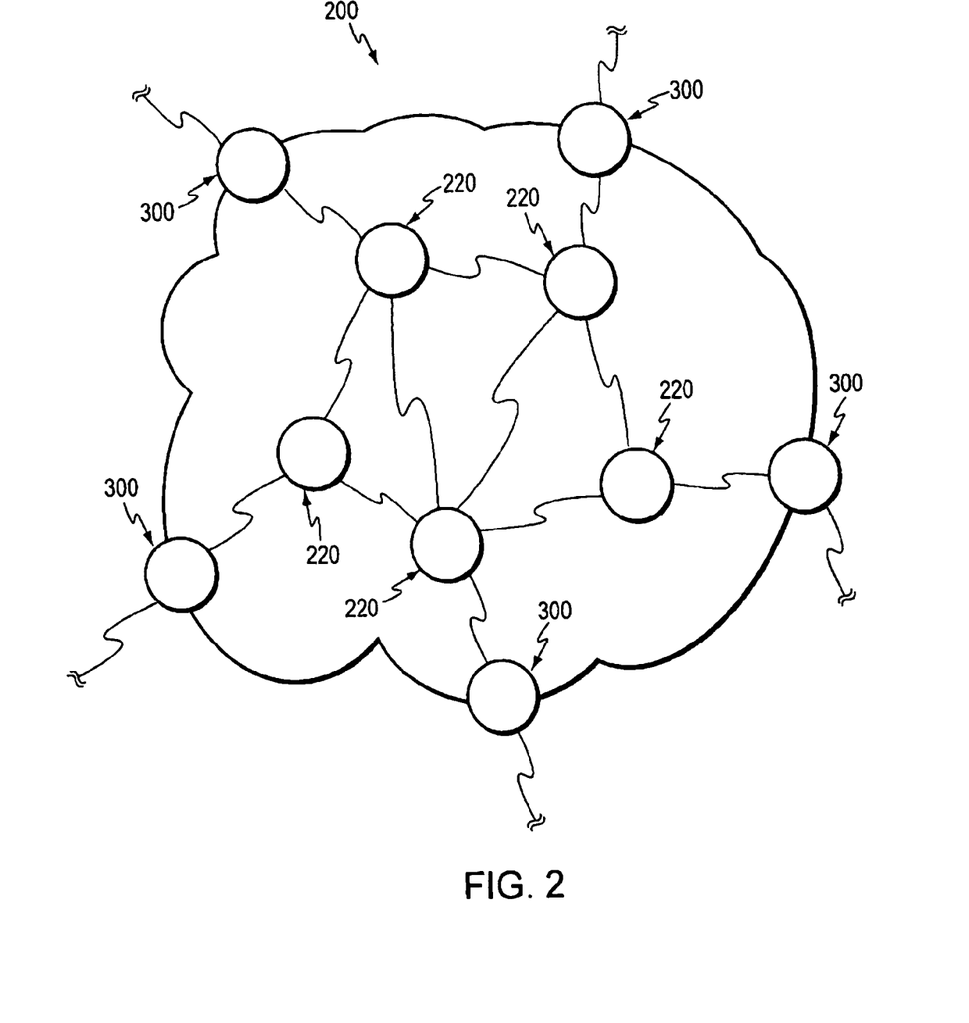
FIG. 2 is an exemplary network having a plurality of nodes in which the present invention may be implemented.

An exemplary network 200 as shown in FIG. 2 illustrates a plurality of nodes 220, 300 such as routers that forward packets in the network to their various destinations. In one instance, nodes 300 at the outer edges of the network have policers that monitor the entering traffic. These policers detect violations in actual traffic flow as compared with a setup rate and penalize accordingly. In another instance, nodes 220 have policers that monitor the traffic entering the nodes. The policer in the node may regulate the traffic flow to ensure that the node does not get overflowed.

Figure 3:
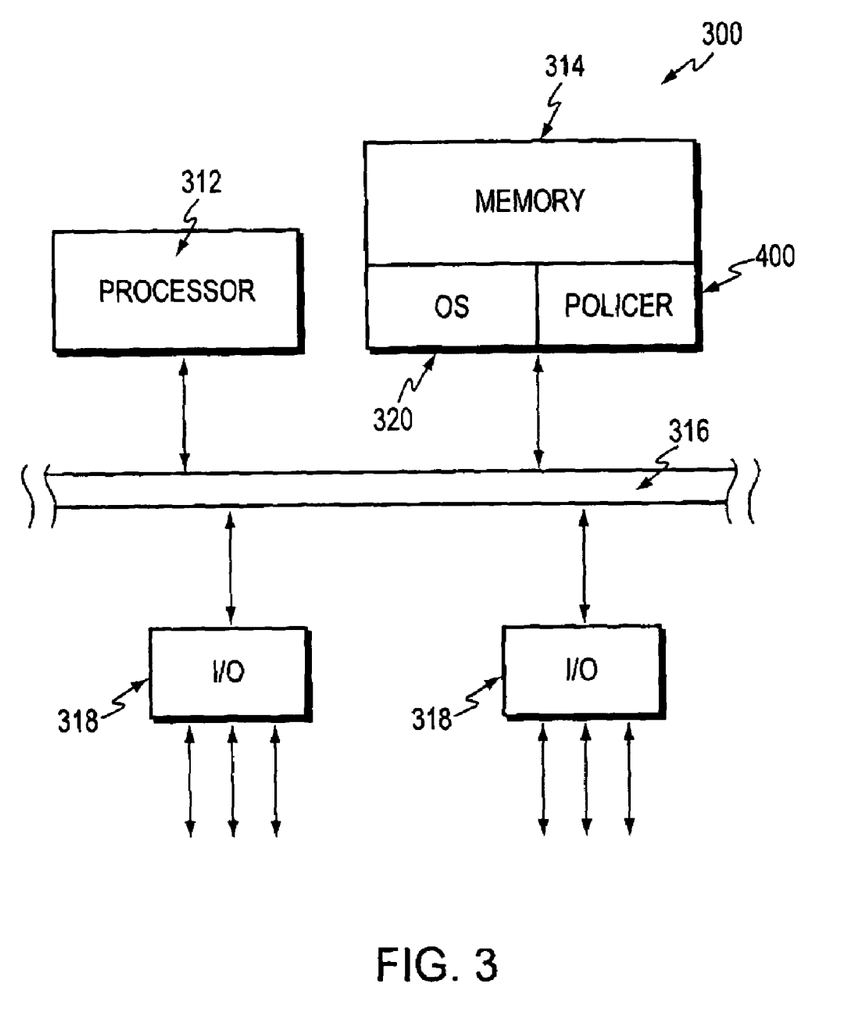
FIG. 3 is a schematic diagram of a router including a policer constructed in accordance with the invention.

FIG. 3 illustrates a node such as a router 300 with a policer 400 that is constructed in accordance with the invention. For purposes of illustration, only one policer is shown although the router may have a plurality of policers that may police the traffic according to the entering packet classification, for example. The router 300 in its general form comprises a processing unit 312 and a memory unit 314 coupled together by a bus or a switch fabric 316. Further coupled to the switch fabric may be a plurality of input/output (I/O) interfaces 318 that interact with other nodes in the network. In one example, an operating system (OS) 320 resides in the memory unit 314 along with the policer 400. Together, they facilitate in policing the entering packets when executed by the processing unit 312.

The memory unit 314 may be a volatile memory such as a Dynamic Random Access Memory (DRAM). The policer 400 may also reside in a non-volatile memory such as a Read Only Memory (ROM) or a Flash memory. Further, the policer may be stored in a storage medium such as magnetic or optical disks. Collectively, the mentioned memories, storage mediums and the like will be referred to as a processor executable memory. Additionally, the policer may be implemented in hardware such as an application specific integrated circuit (ASIC).

Figure 4:
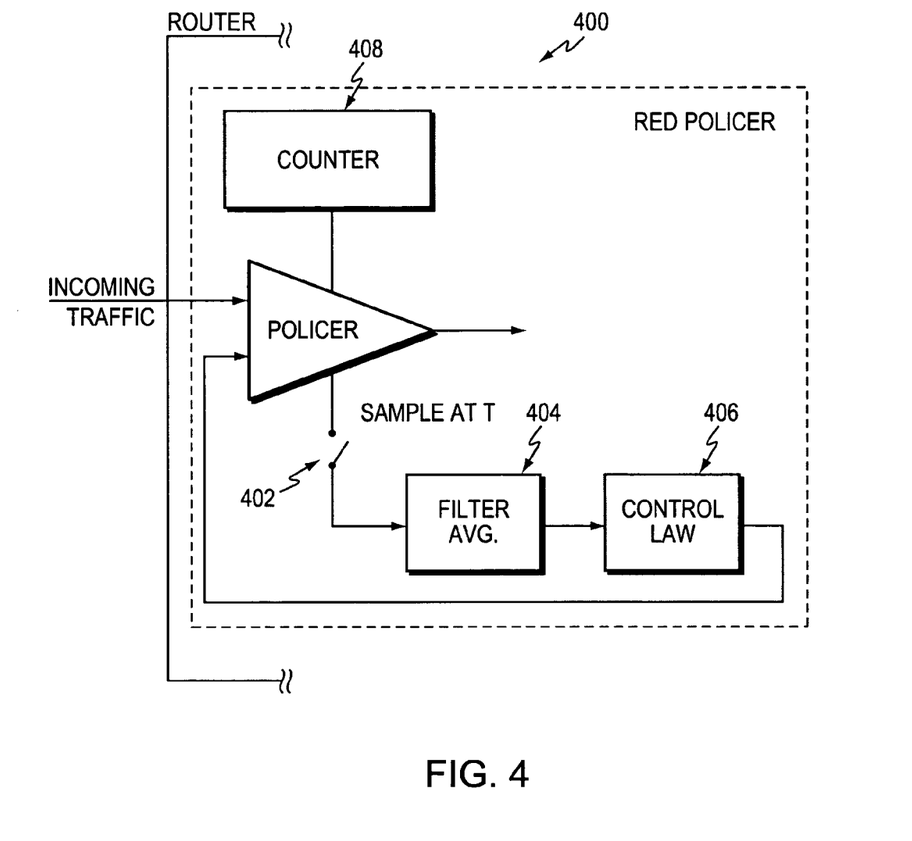
FIG. 4 is a schematic diagram of a Random Early Detection (RED) policer implemented in a router.

As shown in FIG. 4 in more detail, the policer 400 based on Random Early Detection (RED) uses a running estimate (which in one instance, is based on an exponential weighted moving average (EWMA)) of the average packet flow and is shown as filter block 404. Because the drop policy is based on the filtered packet rate, this feature allows the policer to absorb traffic bursts without dropping the last packets of the burst, commonly called the "tail dropping" problem. Nodes within a network inherently generate bursty traffic. Policers using token buckets or virtual scheduling algorithms usually drop the last arriving packets, that is they tail drop the bursts.

An advantage of the RED policer 400 is that it is fair when dropping packets because that decision is based on randomness. The RED policer 400 uses randomization in choosing which arriving packets to drop; with this method, the probability of dropping a packet from a particular sending node is roughly proportional to that node's share of the bandwidth. Fairness arises from the fact that the randomness "samples" the input stream, and thus if a particular stream's packets appear in the stream more frequently, they will be "sampled" more frequently and therefore dropped more frequently.

One option is to measure in bytes rather than in packets. Measurement in bytes allows more accurate measurement of the actual filtered virtual time debt, and thus allows a more accurate response to increasing filtered virtual time debt.

Briefly, when the filtered packet flow rate passes a lower threshold, the RED policer drops arriving packets randomly with a low probability. The drop probability increases with increasing filtered packet flow rate and all packets are dropped once the filtered packet flow rate reaches an upper threshold. However, the upper threshold is not usually reached because the RED's regulating characteristic matches the input rate with the output rate based on a control law similar to that found in a closed-loop servo system. The control law block is shown as block 406. Though not necessary, the RED policer 400 is suitable in a network where the transmission protocol responds to the dropped packets as indications that the transmission rate should be lowered. That is, a packet dropped by a RED policer causes a source station using an adaptive flow technique such as TCP/IP to reduce its transmission rate.

Another feature is that the policer using RED need not be tightly coupled to packet forwarding and its computations do not have to be made in the time-critical packet forwarding path. Much of the work such as the computation of the filtered packet flow rate and of the packet-dropping probability may be performed in parallel with the packet forwarding, or may be computed as a low-priority task. Thus, RED can be adapted to increasingly-high-speed output lines.

The use of a sampler 402 leads to a simpler forwarding path, better parameter settings of the filter block 404 and an architecture that lends itself to high-speed implementations. The sampling and the filtering may be performed at intervals that are either fixed or random. At each sample, the control law block 406 uses the filtered value from the filter block 404 to decide whether and when to drop an arriving packet. As will later become come apparent, the sampling time is a factor that determines the gain of the filter. When the control law block 406 determines that a packet is to be dropped, the policer 400 sets a counter 408, whose operation will be further described below.

The RED policer 400 can be viewed as controlling a virtual queue in which its capacity limit is determined by a virtual time debt. A virtual time debt is a difference between the real time of a packet arrival and the theoretical (virtual) time the packet should have arrived (for instance, the virtual time of packet arrival may be the contracted packet rate between a user and an ISP, or between an ISP and a backbone provider).

The RED policer 400's filter block 404 provides the filtering operation that calculates the virtual time debt at intervals of sample time T. As an example, the filter operation may be based on an EWMA low-pass filter, which is expressed as:

$$F_k = (1-g)F_{k-1} + g(VT-now) \quad \text{EQUATION 1}$$

where g is the gain of the filter and having a value $0 < g. < 1$, $F_k$ is the filtered virtual time debt at sample time k, $F_{k-1}$ is the filtered virtual time debt at sample time k−1 and VT−now is the virtual time debt at sample k.

In particular, the filter uses a gain value g, wherein g is the inverse of the sample time in a round-trip Internet time. For instance, one round-trip time is where when a router drops a packet, the TCP receiver fails to receive a packet, does not send an ACK, and the sender times out. The sender then retransmits the missing packet to the TCP receiver. The rationale is that the filter will average over a round-trip time and approximate the mean over the round-trip time. If the average sample interval is the transmission time of an MTU, the gain should be the inverse of the bandwidth of the MTU sized packets. Because the actual-round trip time of any connection is difficult to obtain, a canonical value such as a 100 milliseconds may be used. For computational efficiency, the gain is rounded to the nearest power of two.

The gain should typically be set in a manner suitable for the particular connection. Note that if the gain is set too small in comparison with the inverse of the bandwidth, the EWMA filter would be too slow to respond to accumulation of the virtual time debt. On the other hand, if the gain is too large, it causes the EWMA filter to respond too quickly resulting in unnecessary packets being dropped. For additional reading concerning the sampling time interval and the gain of the EWMA filter, see V. Jacobson, K. Nichols, K. Poduri, "*RED in a Different Light*", not published but widely circulated.

For example, a value of g of 0.01 has been found suitable for many applications, a value of 0.01 for g permits the new information to affect the accumulated value by only 1%.

In summing, the RED policer may be constructed in the following manner. Its first component calculates the single packet virtual time debt by the formula:

$$\text{Time debt} = \text{expected packet arrival time} - \text{actual packet arrival time} \quad \text{EQUATION 2}$$

The time debt is represented by $F_R$ for the $k^{th}$ received packet, and the EWMA is computed using Equation 1.

Its other component calculates the packet-dropping probability, which in turn determines whether and when to drop packets, given the traffic flow. So far, the first component of the RED policer has been discussed. Concerning the latter component of random dropping, it is desired to drop the packets at random intervals and from randomly chosen flows in order to avoid unfairness, and to drop packets with sufficiency as to regulate the traffic flow.

Figure 5:
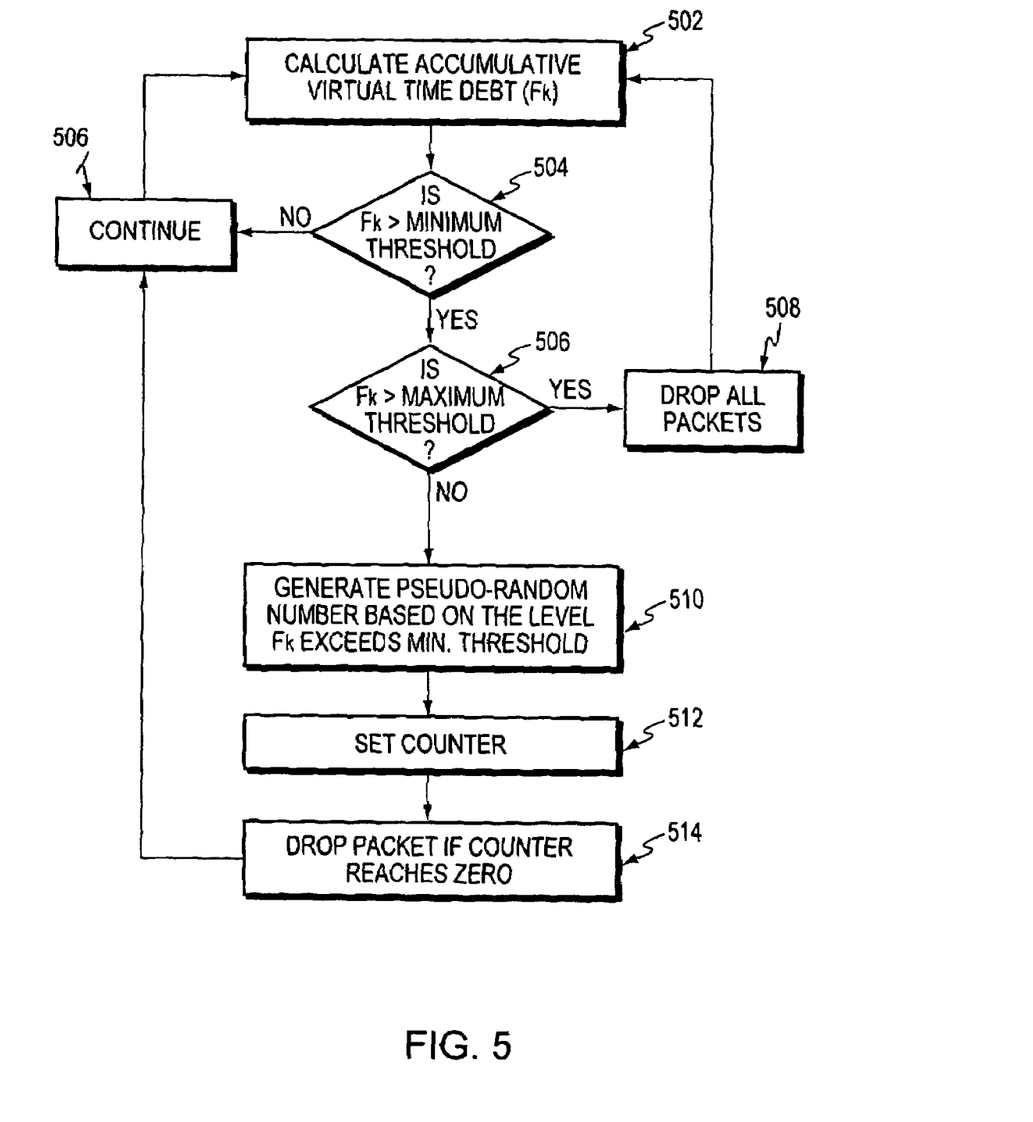
FIG. 5 is a flow diagram of an exemplary RED policer.

The RED policer randomly drops packets when the virtual time debt exceeds some predetermined minimum threshold for example, as given by Equation 1. As shown in FIG. 5, in block 502, the RED policer calculates the filtered virtual time debt. In block 504, the filtered virtual time debt is compared with a minimum threshold. If the filtered virtual time debt is less than the minimum threshold, in block 506, no packets are dropped. In block 506, if the filtered virtual time debt exceeds a certain maximum threshold, in block 508, all packets are dropped until the filtered time debt falls below the maximum threshold. Else if the filtered virtual time debt is between the minimum threshold and the maximum threshold, in block 510, the RED policer generates a pseudorandom number based on the level the filtered virtue time debt exceeds the minimum threshold and sets a counter (such as the one shown in FIG. 4) with the pseudo-random number in block 512. Note that in blocks 512–514, the counter once set begins to count down with each arriving packet and once the counter reaches zero, the corresponding packet is dropped and the counter is then reset based on the activities in blocks 502–510. Usually the maximum threshold will be not reached if all the sending nodes are cooperative in reducing the packet transmission as the packets are dropped between the minimum threshold and the maximum threshold; this ensures that the filtered virtual time debt does not significantly exceed the minimum threshold.

Figure 6:
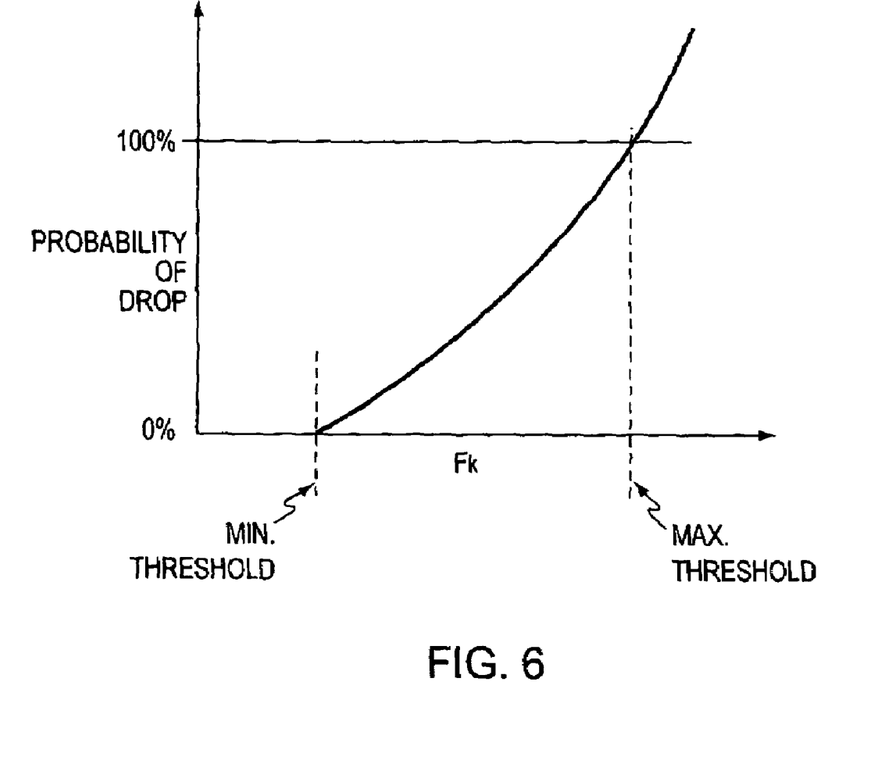
FIG. 6 is a graph showing a relationship between the filtered time debt and the packet drop probability.

As mentioned above, random packet-dropping is based on the level the filtered virtual time debt has exceeded the minimum threshold. As an example, referring to the graph on FIG. 6, the RED policer may determine that the probability of dropping a packet is 30 percent based on the level the filtered virtual time debt has exceeded the minimum threshold. Then, the inverse of 30 percent rounded to the nearest number is the range the random number will be selected to set the counter. In this instance, the random number will be from one to three. Suppose that the random number generated is two, then the RED policer sets the counter to two, which is decremented with each incoming packet. When the counter reaches zero, the corresponding incoming packet is dropped. Note the relationship that the higher the filtered virtual time debt exceeds the minimum threshold the higher the packet drop probability and hence the increase in packet drop frequency. Note that this method could be used to control the virtual time debt size even if the sending node fails to reduce its throughput in response to the dropped packets.

Figure 7:
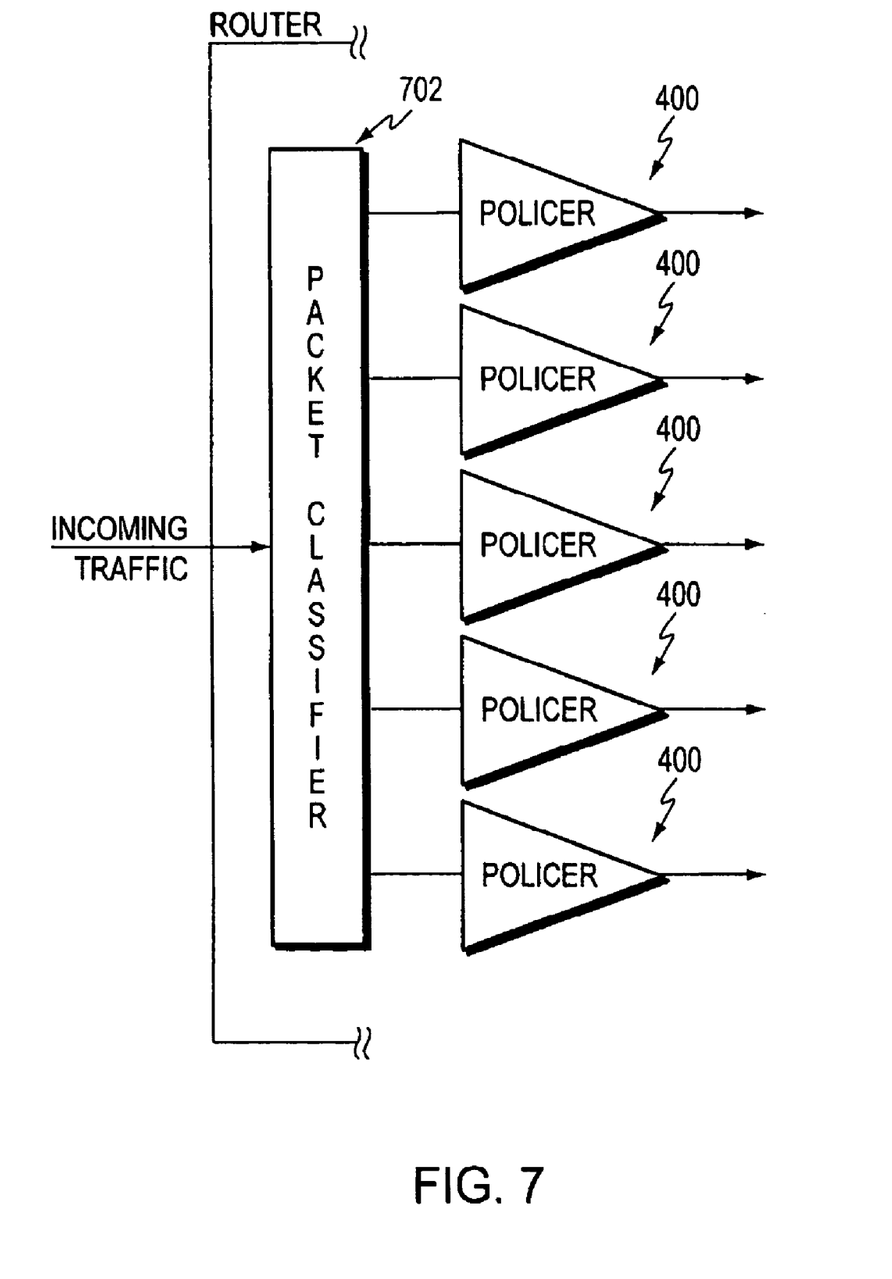
FIG. 7 is a schematic diagram of a router having a plurality of policers constructed in accordance with the invention and wherein, packets are channeled to the policers by a packet classifier.

FIG. 7 is a schematic diagram of a plurality of policers used to police an arbitrary mix of data traffic flowing in a wire. The data packets are passed through a packet classifier 702 that determines which packet should go to which policer 400. For instance, the packet classification may be based on the source address of the packet. Each policer may have a pre-programmed virtual time debt that corresponds to the contracted rate of the source of the packets. Once the packets enter the policers 400, the operation of each policer will be similar to that described with respect to FIG. 4.

An improved policer based on RED has been described. It will however be apparent that other variations and modifications may be made to the described embodiments, with the attainment of some or all of their advantages. Therefore, it is the object of the appended claims to cover all such variations and modifications that come within the true spirit and scope of the invention.

What is claimed is:

1. A policer based on Random Early Detection (RED), comprising:
a filter to determine a filtered virtual time debt, the filtered virtual time debt determined based on an average difference between a time packets are expected to arrive and a time the packets actually arrive; and
a control law circuit to receive the filtered virtual time debt from the filter and to determine whether a packet should be dropped.

2. The RED policer of claim 1, wherein a virtual time debt is configured to use a time T in which a packet is expected to arrive and is computed using a predetermined output transmission rate.

3. The RED policer of claim 2, wherein predetermined output transmission rate is given by a traffic contract.

4. The RED policer of claim 1, wherein the filter is based on an exponential weighted moving average (EWMA) virtual time delay using the expression, $$EWMA_k = (1-g)EWMA_{k-1} + g(VTD)_k,$$

where k indicates the presently received packet, and k−1 indicates the last packet received, the virtual time debt (VTD) is computed by the expression: VTD=T(packet expected to arrive)−T(packet actually arrives), and g is the gain of the filter.

5. The RED policer of claim 1, further comprising: a sampler to sample a virtual time debt at a sampling interval, and to transmit the sampled virtual time debt to the filter.

6. The RED policer of claim 1, further comprising:
a random generator to generate a number based on the control law circuit's de-termination as to whether a packet should be dropped; and
a counter configured to be set with the number generated by the random generator, wherein the counter is configured to count packets passing through the RED policer up to the set number, and wherein the RED policer is configured to drop a packet when the counter has counted out the set number.

7. The RED policer of claim 6, further comprising:
the control law circuit to determine a probability of a packet being dropped based on the filtered time debt exceeding a predetermined minimum threshold, and to specify a range of numbers based on the probability; and
the random generator to randomly generate a number in the range specified by the control law circuit.

8. The RED policer of claim 1, further comprising: the filter further configured to calculate the average as an exponential weighted moving average (EWMA).

9. A policer based on Random Early Detection (RED), comprising:
means for determining a moving average of a virtual time debt, the virtual time debt determined based on a difference between a time packets are expected to arrive and a time the packets actually arrive; and
means for determining wheher a packet should be dropped based on a value of the moving average of the virtual time debt.

10. The RED policer of claim 9, further comprises means for sampling a virtual time debt at a sampling interval, and transmitting the result to the moving average determining means.

11. The RED policer of claim 9, further comprises:
means for generating a random number based on the result of the packet dropping means; and
means for counting a number of packets passing through the RED policer up to the random number generated by the random number generating means, wherein the RED policer drops a packet when the counting means has counted out the generated random number.

12. The RED policer of claim 9, further comprising: means for calculating the average as an exponential weighted moving average (EWMA).

13. A network device comprising:
a plurality of Random Early Detection (RED) policers, wherein each RED policer comprises,
a filter to determine a filtered virtual time debt, the filtered virtual time debt determined based on an average difference between a time packets are expected to arrive and a time the packets actually arrive; and
a control law circuit to receive the filtered virtual time debt from the filter and to determine whether a packet should be dropped; and
a packet classifier to determine which packet should go to which RED policer.

14. The network device of claim 13, further comprising: the filter further configured to calculate the average as an exponential weighted moving average (EWMA).

15. A method of policing packets in a network device, the method comprising the steps of:
determining a filtered virtual time debt of a traffic, the filtered virtual time debt determined based on an average difference between a time packets of the traffic are expected to arrive and a time the packets actually arrive;
comparing the filtered virtual time debt with a predetermined minimum threshold;
and if the filtered virtual time debt exceeds the minimum threshold, then
generating a random number that is used to determine which packet should be dropped.

16. The method of claim 15, wherein generating a random number further comprises the steps of:
generating the random number in a range based on a level by which the filtered virtual time debt exceeds the minimum threshold;
setting a counter with the random number; and
dropping a packet when the counter has counted out the random number.

17. The method of claim 15, further comprising: calculating the average as an exponential weighted moving average (EWMA).

18. A computer readable medium having instructions contained therein, which when executed by a computer performs a method comprising the steps of:
determining a filtered virtual time debt of a traffic, the filtered virtual time debt determined based on an average difference between a time packets of the traffic are expected to arrive and a time the packets actually arrive;
comparing the filtered virtual time debt with a predetermined minimum threshold; and if the filtered virtual time debt exceeds the minimum threshold, then
generating a random number that is used to determine which packet should be dropped.

19. The medium of claim 18, wherein generating a random number further comprises the steps of:
generating the random number in a range based on a level the filtered virtual time debt exceeds the minimum threshold;
setting a counter with the random number; and
dropping a packet when the counter has counted out the random number.

20. The medium of claim 18, further comprising the step of: calculating the average as an exponential weighted moving average (EWMA).

21. A method of policing packets in a network device, the method comprising the steps of:
determining a filtered virtual time debt of packets flowing through the network device, the filtered virtual time debt determined based on an average difference between a time packets are expected to arrive and a time the packets actually arrive; and
determining whether a packet should be dropped based on the filtered virtual time debt of the packets.

22. The method as in claim 21, further comprising: determining that a packet should be dropped when a virtual time debt threshold has been reached.

23. The method as in claim 21, further comprising: determining a moving average of the virtual time debt.

24. The method as in claim 21, further comprising: calculating the virtual time debt as the difference between a time a packet is expected to arrive and a time the packet actually arrives.

25. The method as in claim 24, further comprising: calculating the time a packet is expected to arrive according to a traffic contract.

26. The method as in claim 21, further comprising: sampling the virtual time debt at a sampling interval.

27. The method as in claim 21, further comprising: generating a random number;
counting a number of packets passing through the network device up to the random number; and
dropping a packet when the counted number reaches the random number.

28. The method of claim 21, further comprising: calculating the average as an exponential weighted moving average (EWMA).

29. A method of policing packets in a network device, the method comprising the steps of:
determining a filtered virtual time debt of packets flowing through the network device, the filtered virtual time debt computed as an average positive delay from an expected packet arrival time established by a traffic contract to an actual packet arrival time;
determining that packets should be dropped when the filtered virtual time debt of the packets exceeds a predetermined value; and if so
choosing a packet to be dropped, the chosen packet in response to a random number; and
dropping the chosen packet.

30. The method as in claim 29, further comprising:
generating the random number;
counting a number of packets passing through the network device Up to the random number; and
dropping a packet when the counted number reaches the random number.

31. The method of claim 29, further comprising: calculating the average as an exponential weighted moving average (EWMA).

32. A policer, comprising:
means for determining a filtered virtual time debt of packets flowing through the network device, the virtual time debt computed as an average positive delay from an expected packet arrival time established by a traffic contract to an actual packet arrival time;
means for determining that packets should be dropped when the virtual time debt of the packets exceeds a predetermined value; and if so
means for choosing a packet to be dropped, the chosen packet in response to a random number; and
means for dropping the chosen packet.

33. The policer of claim 32, further comprising: means for calculating the average as an exponential weighted moving average (EWMA).

34. A computer readable media, the computer readable media containing instructions for execution in a processor for the practice of the method comprising the steps of:
determining a filtered virtual time debt of packets flowing through the network device, the filtered virtual time debt determined based on an average difference between a time packets are expected to arrive and a time the packets actually arrive; and
determining whether a packet should be dropped based on the filtered virtual time debt of the packets.

35. The medium of claim 34, further comprising the step of: calculating the average as an exponential weighted moving average (EWMA).

36. A method of policing packets in a network device, the method comprising the steps of:
determining a filtered virtual time debt of packets flowing through the network device, the filtered virtual time debt computed as an average positive delay from an expected packet arrival time to an actual packet arrival time; and
determining whether a packet should be dropped based on the filtered virtual time debt of the packets.

37. The method as in claim 36, in the event a packet should be dropped, further comprising:
generating a random number;
counting a number of packets passing through the network device up to the random number; and
dropping a packet when the counted number reaches the random number.

38. The method of claim 36, further comprising: calculating the average as an exponential weighted moving average (EWMA).

39. A method of policing packets in a network device, comprising:
determining an actual arrival time of a packet;
determining a theoretical arrival time of the packet;
calculating a virtual time debt in response to the actual arrival time and the theoretical arrival time;
using a filter to determine a filtered virtual time debt of a traffic, the filtered virtual time debt determined based on an average of a plurality of virtual time debts for the traffic;

comparing the filtered virtual time debt with a predetermined value;

deciding if the filtered virtual time debt exceeds the predetermined value; and generating, in response to the filtered virtual time debt exceeding the predetermined value, a random number that is used to determine which packet should be dropped.

40. The method of claim 39, further comprising:
computing a predetermined output transmission rate.

41. The method of claim 40, further comprising:
setting the predetermined output transmission rate by a traffic contract.

42. The method of claim 39, further comprising:
sampling the virtual time debt at a sampling interval; and
transmitting the sampled virtual time debt to the filter.

43. The method of claim 39, further comprising:
using a counter that is set with the generated random number;
counting packets passing through a RED policer up to the set number;
dropping the packet when the counter has counted out the set number.

44. The method of claim 39, further comprising:
determining a moving average for the filtered virtual time debt.

45. The method of claim 39, further comprising: calculating the average as an exponential weighted moving average (EWMA).

46. A policer based on Random Early Detection (RED), comprising:
an operating system to determine an actual arrival time of a packet and a theoretical arrival time of the packet;
a control law circuit to i) calculate a virtual time debt in response to the actual arrival time and the theoretical arrival time,
a filter to determine a filtered virtual time debt of a traffic, the filtered virtual time debt determined based on an average of a plurality of virtual time debts for the traffic;
the control law circuit further to ii) compare the filtered virtual time debt with a predetermined value, and iii) decide if the filtered virtual time debt exceeds the predetermined value; and
a random number generator to generate, in response to the filtered virtual time debt exceeding the predetermined value, a random number that is used to determine which packet should be dropped.

47. The policer of claim 46, further comprising:
the filtered virtual time debt is configured to use time T in which the packet is expected to arrive, and is computed using a predetermined output transmission rate.

48. The policer of claim 47, further comprising:
the predetermined output transmission rate is given by a traffic contract.

49. The policer of claim 46, further comprising:
a sampler to sample the virtual time debt at a sampling interval and to transmit the sampled virtual time debt to the filter.

50. The policer of claim 46, further comprising:
a counter configured to be set with the number generated by the random number generator, and configured to count packets passing through the RED policer up to the set number; and
the RED policer configured to drop the packet when the counter has counted out the set number.

51. The policer of claim 46, further comprising:
the filter further to determine a moving average for the filtered virtual time debt.

52. The policer of claim 46, further comprising: the filter further configured to calculate the average as an exponential weighted moving average (EWMA).

53. An apparatus for policing packets in a network device, comprising:
means for determining an actual arrival time of a packet;
means for determining a theoretical arrival time of the packet;
means for calculating a virtual time debt in response to the actual arrival time and the theoretical arrival time;
means for using a filter to determine a filtered virtual time debt of a traffic, the filtered virtual time debt determined based on an average of a plurality of virtual time debts for the traffic;
means for comparing the filtered virtual time debt with a predetermined value;
means for deciding if the filtered virtual time debt exceeds the predetermined value; and
means for generating, in response to the filtered virtual time debt exceeding the predetermined value, a random number that is used to determine which packet should be dropped.

54. The apparatus of claim 53, further comprising:
means for computing a predetermined output transmission rate.

55. The apparatus of claim 54, further comprising:
means for setting the predetermined output transmission rate by a traffic contract.

56. The apparatus of claim 53, further comprising:
means for using a counter that is set with the number generated by the random number generator;
means for counting packets passing through a RED policer up to the set number;
means for dropping the packet when the counter has counted out the set number.

57. The apparatus of claim 53, further comprising:
means for determining a moving average for the filtered virtual time debt.

58. The apparatus of claim 53, further comprising: means for calculating the average as an exponential weighted moving average (EWMA).

59. A computer readable medium having instructions contained therein, which when executed by a computer performs a method comprising the steps of:
determining an actual arrival time of a packet;
determining a theoretical arrival time of the packet;
calculating a virtual time debt in response to the actual arrival time and the theoretical arrival time;
using a filter to determine a filtered virtual time debt of a traffic, the filtered virtual time debt determined based on an average of a plurality of virtual time debts for the traffic;
comparing the filtered virtual time debt with a predetermined value;
deciding if the filtered virtual time debt exceeds the predetermined value; and
generating, in response to the filtered virtual time debt exceeding the predetermined value, a random number that is used to determine which packet should be dropped.

60. The medium of claim 59, further comprising the step of: calculating the average as an exponential weighted moving average (EWMA).

* * * * *